July 14, 1925.
W. A. HORRICKS
SEARCHLIGHT
Filed Feb. 5, 1925
1,545,655
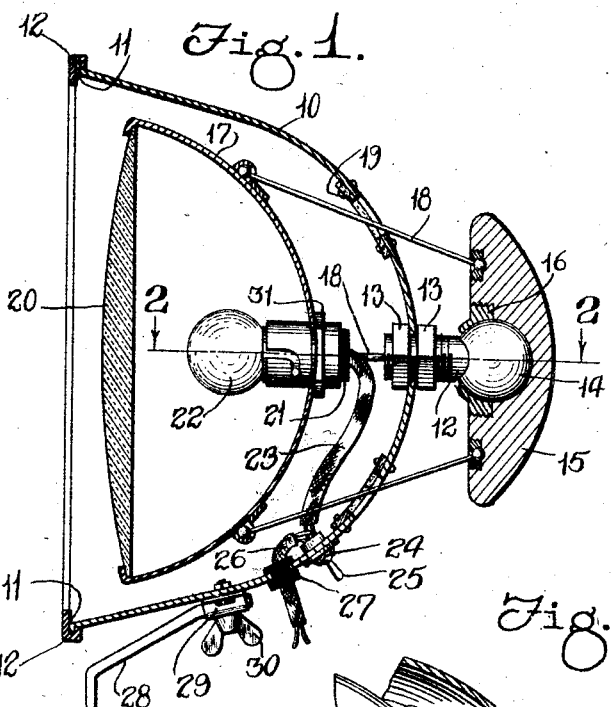
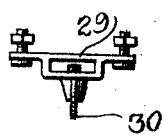
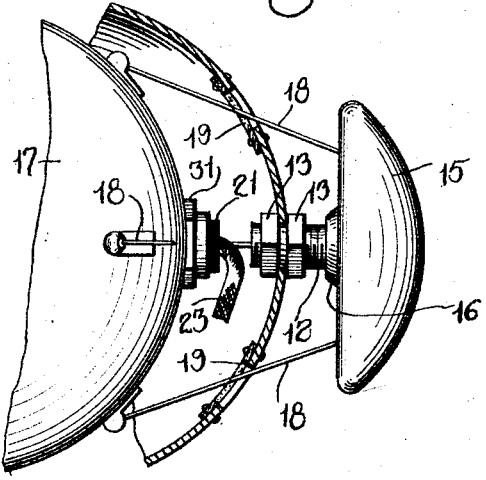
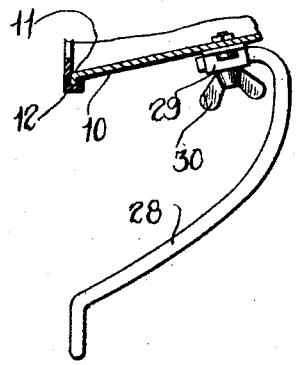
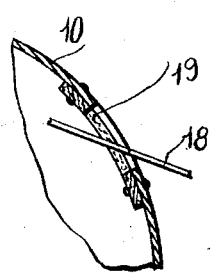
INVENTOR.
W. A. Horricks.
BY
ATTORNEYS.

Patented July 14, 1925.

1,545,655

UNITED STATES PATENT OFFICE.

WILLIAM A. HORRICKS, OF PEMBROKE, ONTARIO, CANADA.

SEARCHLIGHT.

Application filed February 5, 1925. Serial No. 7,042.

*To all whom it may concern:*

Be it known that I, WILLIAM A. HORRICKS, a subject of the King of England, residing at Pembroke, in the Province of Ontario, and in the Dominion of Canada, have invented certain new and useful Improvements in a Searchlight, of which the following is a specification.

This invention relates to search lights for automobiles and other like vehicles provided with a wind shield. More especially the invention relates to a search light adapted to be positioned on the inner or rear side of the wind shield glass and which is so arranged that its beam may be shown in any desired direction in front of the machine, the light being also arranged for use as a trouble light.

One principal object of the invention is to improve the general construction of head lights or search lights of this character.

A second object of the invention is to provide a head light having a casing adapted to fit against the rear side of a wind shield glass, the light being provided with an electric lamp supported on a reflector mounted in a novel manner for adjustment within said casing.

A third important object of the invention is for providing novel adjusting means for such a reflector.

A fourth important object of the invention is to provide an improved device of this character wherein the lamp may be adjusted relative to the reflector and the reflector adjusted both angularly and axially with respect to the casing.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a vertical median section through such a search light, certain of the parts being shown in elevation.

Figure 2 is a section on the line 2—2 of Figure 1.

Figure 3 is a detail view of a modified form of bracket for supporting the casing and intended to be used with narrow lower wind shields.

Figure 4 is an enlarged detail showing the guide means for the adjusting rods.

Figure 5 is a section showing the attachment of the supporting clamps to the casing.

In the present embodiment of the invention there is provided an outer casing 10 having a rim 11, on which is located a rubber ring 12 intended to bear against the wind shield and provides a protection against breaking thereof.

At the center of the rear of this casing there is provided a suitable opening through which passes a threaded stem 12 having an adjusting nut 13 on each side of the casing 10 so that the stem may be adjusted longitudinally in the casing. The outer end of this stem is provided with a base 14 which rests in a suitable socket formed in a control knob or handle 15, a securing nut or plate 16 being employed to retain the ball 14 in its socket.

At 17 is a reflector which is connected to the knob 15 by rods 18, the connection with the reflector and with the knob being in each case a ball and socket joint. Preferably four of these rods are employed and they pass through suitable openings in stiff leather washers 19, closing corresponding openings in the casing 10. Now, these four rods 18 are arranged at the four corners of a square, one diagonal of the square being vertical and the other horizontal, thus the reflector is supported solely by the four rods. The reflector is provided with the usual lens 20 and carries at the rear end an adjustable socket 21 wherein is mounted the lamp 22. The socket 21 is connected by wires 23 with a switch 24 having a projecting handle 25, by means of which it may be operated. The switch is also connected by a wire 26 with a socket 27 to which an extension cord may be attached when the device is to be used as a trouble light.

A bracket is secured to some suitable part of the automobile, such as the lower center frame of the wind shield, on the lower part of the casing 10 is a clamp 29 which may be slid over the bracket and secured in position by a thumb nut 30. A similar clamp may be used if desired to detachably connect the bracket 28 to the wind shield or other desired part of the automobile. Where the device is used for a lower wind shield the bracket preferably takes the form shown in Figure 1, while, where the lower wind shield is narrow and it is desirable to attach the lamp to the upper wind shield the bracket takes the form shown in Figure 3.

Now it will be observed that by means of the adjusting nut 31, the lamp may be focused in the reflector 17 while, by means of the nuts 13, the reflector may be moved to a slight extent forwardly and rearwardly in the casing 10. Furthermore, the movement of the knob 15 will control the movement of the reflector since tilting the knob will effect corresponding tilting movement of such reflector.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a search light, a casing, a reflector in said casing, a series of rods slidably and pivotally mounted in said casing and having their forward ends connected to said reflector at points substantially equally spaced from the center thereof, a knob mounted on the rear of said casing for universal movement with respect thereto and having the rear ends of said rods connected therewith, and a lamp supported by said reflector and movable therewith.

2. In a search light, a casing, a reflector in said casing, a series of rods slidably and pivotally mounted in said casing and having their forward ends connected to said reflector at points substantially equally spaced from the center thereof, a knob mounted on the rear of said casing for universal movement with respect thereto and having the rear ends of said rods connected therewith, a lamp supported by said reflector and movable therewith, and means to adjust the reflector axially of the casing.

3. In a search light, a casing, a reflector in said casing, a series of rods slidably and pivotally mounted in said casing and having their forward ends connected to said reflector at points substantially equally spaced from the center thereof, a knob mounted on the rear of said casing for universal movement with respect thereto and having the rear ends of said rods connected therewith, a lamp supported by said reflector and movable therewith, and means to adjust the reflector axially of the casing, and other means independent of the reflector adjusting means for adjusting the lamps with respect to the reflector along the axis of the latter.

4. In a search light, a casing, a reflector in said casing, a plurality of pairs of rods arranged in planes at right angles to each other and slidably and pivotally mounted in said casing and having their forward ends connected to said reflector at points substantially equally spaced from the center thereof, a knob mounted on the rear of said casing for universal movement with respect thereto and having the rear ends of said rods connected therewith, and a lamp supported by said reflector and movable therewith.

5. In a search light, a casing, a reflector in said casing, a plurality of pairs of rods arranged in planes at right angles to each other and slidably and pivotally mounted in said casing and having their forward ends connected to said reflector at points substantially equally spaced from the center thereof, a knob mounted on the rear of said casing for universal movement with respect thereto and having the rear ends of said rods connected therewith, a lamp supported by said reflector and movable therewith, and means to adjust the reflector axially of the casing.

6. In a search light, a casing, a reflector in said casing, a plurality of pairs of rods arranged in planes at right angles to each other and slidably and pivotally mounted in said casing and having their forward ends connected to said reflector at points substantially equally spaced from the center thereof, a knob mounted on the rear of said casing for universal movement with respect thereto and having the rear ends of said rods connected therewith, a lamp supported by said reflector and movable therewith, and means to adjust the reflector axially of the casing, and other means independent of the reflector adjusting means for adjusting the lamps with respect to the reflector along the axis of the latter.

7. In a search light, a casing, a reflector in said casing, an opening axially of said casing, a threaded stem extending through said opening and having a ball on its rear end, a knob having a socket therein wherein said ball fits, rods arranged in pairs and connecting said knob and reflector, one pair being in a plane at right angles to the other, each rod having ball and socket connections with the knob and reflector, adjusting nuts on said stem on opposite sides of said casing, and a lamp supported by said reflector.

8. In a search light, a casing, a reflector in said casing, an opening axially of said casing, a threaded stem extending through said opening and having a ball on its rear end, a knob having a socket therein wherein said ball fits, rods arranged in pairs and connecting said knob and reflector, one pair being in a plane at right angles to the other, each rod having a ball and socket connections with the knob and reflector, adjusting nuts on said stem on opposite sides of said casing, a lamp supported by said reflector, and means for adjusting said lamp axially of the reflector.

In testimony whereof I affix my signature.

WILLIAM A. HORRICKS.